United States Patent
Sasaki et al.

(10) Patent No.: US 8,075,670 B2
(45) Date of Patent: Dec. 13, 2011

(54) HYDROGEN PERMEABLE MODULE AND USAGE THEREOF

(75) Inventors: Tsuyoshi Sasaki, Muroran (JP);
Tomohiro Ueno, Muroran (JP); Toshiki Kabutomori, Tokyo (JP); Kiyoshi Aoki, Hokkaido (JP); Kazuhiro Ishikawa, Hokkaido (JP)

(73) Assignees: The Japan Steel Works, Ltd., Tokyo (JP); National University Corporation Kitami Institute of Technology, Hokkaido (JP)

( * ) Notice: Subject to any disclaimer, the term of this patent is extended or adjusted under 35 U.S.C. 154(b) by 324 days.

(21) Appl. No.: 12/408,750

(22) Filed: Mar. 23, 2009

(65) Prior Publication Data

US 2010/0083839 A1 Apr. 8, 2010

(30) Foreign Application Priority Data

Mar. 24, 2008 (JP) .................... 2008-076119

(51) Int. Cl.
*B01D 53/22* (2006.01)
(52) U.S. Cl. ................ 95/55; 95/56; 96/4; 96/7; 96/11; 55/524
(58) Field of Classification Search ............. 96/4, 7, 96/11; 95/55, 56; 55/524
See application file for complete search history.

(56) References Cited

U.S. PATENT DOCUMENTS

| | | | |
|---|---|---|---|
| 2,824,620 A * | 2/1958 | De Rosset | 95/56 |
| 4,430,048 A | 2/1984 | Fritsch | |
| 5,498,278 A * | 3/1996 | Edlund | 96/11 |
| 5,904,754 A * | 5/1999 | Juda et al. | 96/11 |
| 6,098,991 A | 8/2000 | Onishi | |
| 6,183,542 B1 * | 2/2001 | Bossard | 96/11 |
| 6,267,801 B1 * | 7/2001 | Baake et al. | 95/56 |
| 6,527,832 B2 * | 3/2003 | Oku et al. | 96/4 |
| 6,569,227 B2 * | 5/2003 | Edlund et al. | 96/4 |
| 6,946,020 B2 * | 9/2005 | Han et al. | 96/7 |
| 7,056,369 B2 * | 6/2006 | Beisswenger et al. | 96/7 |
| 2004/0003720 A1 | 1/2004 | Beisswenger et al. | |
| 2006/0039806 A1 | 2/2006 | Becker | |

FOREIGN PATENT DOCUMENTS

| | | |
|---|---|---|
| EP | 1 362 630 A1 | 11/2003 |
| EP | 1 433 521 A1 | 6/2004 |
| JP | 57-146078 A | 9/1982 |
| JP | 04-74045 B2 | 11/1992 |
| JP | 05-085702 A | 4/1993 |
| JP | 5-79367 B2 | 11/1993 |

(Continued)

OTHER PUBLICATIONS

European Search Report dated Aug. 7, 2009.

(Continued)

*Primary Examiner* — Jason M Greene
(74) *Attorney, Agent, or Firm* — Sughrue Mion, PLLC

(57) ABSTRACT

A hydrogen permeable module includes a hydrogen permeable membrane that permeates hydrogen, an outer peripheral part of the hydrogen permeable membrane being restricted, an inside of the outer peripheral part of the hydrogen permeable membrane being not restricted. The hydrogen permeable module permeates the hydrogen by constantly keeping a pressure of a primary side to a pressure that is equal to or more than a pressure of a secondary side. The inside of the outer peripheral part of the hydrogen permeable membrane is not restricted so as to be capable of expanding to the secondary side.

8 Claims, 8 Drawing Sheets

FOREIGN PATENT DOCUMENTS

| | | |
|---|---|---|
| JP | 08-073201 A | 3/1996 |
| JP | 3540495 B2 | 9/1997 |
| JP | 11-303802 A | 11/1999 |
| JP | 2002-521180 A | 7/2002 |
| JP | 2003-165710 A | 6/2003 |
| JP | 2005-095841 A | 4/2005 |
| JP | 2006-520868 A | 9/2006 |
| JP | 2006-265638 A | 10/2006 |
| JP | 2007-136337 A | 6/2007 |
| JP | 2008-253956 A | 10/2008 |
| WO | 03/026776 A1 | 4/2003 |
| WO | 2005/077818 A1 | 8/2005 |
| WO | 2006/011619 A1 | 2/2006 |
| WO | 2007/105594 A1 | 9/2007 |

OTHER PUBLICATIONS

Notice of Reasons for Rejection dated Mar. 2, 2010 issued in Japanese counterpart Application No. 2008-076119; 10 pages.

Japanese Office Action issued on Sep. 29, 2010 in the corresponding Japanese Patent Application No. 2008-076119.

\* cited by examiner

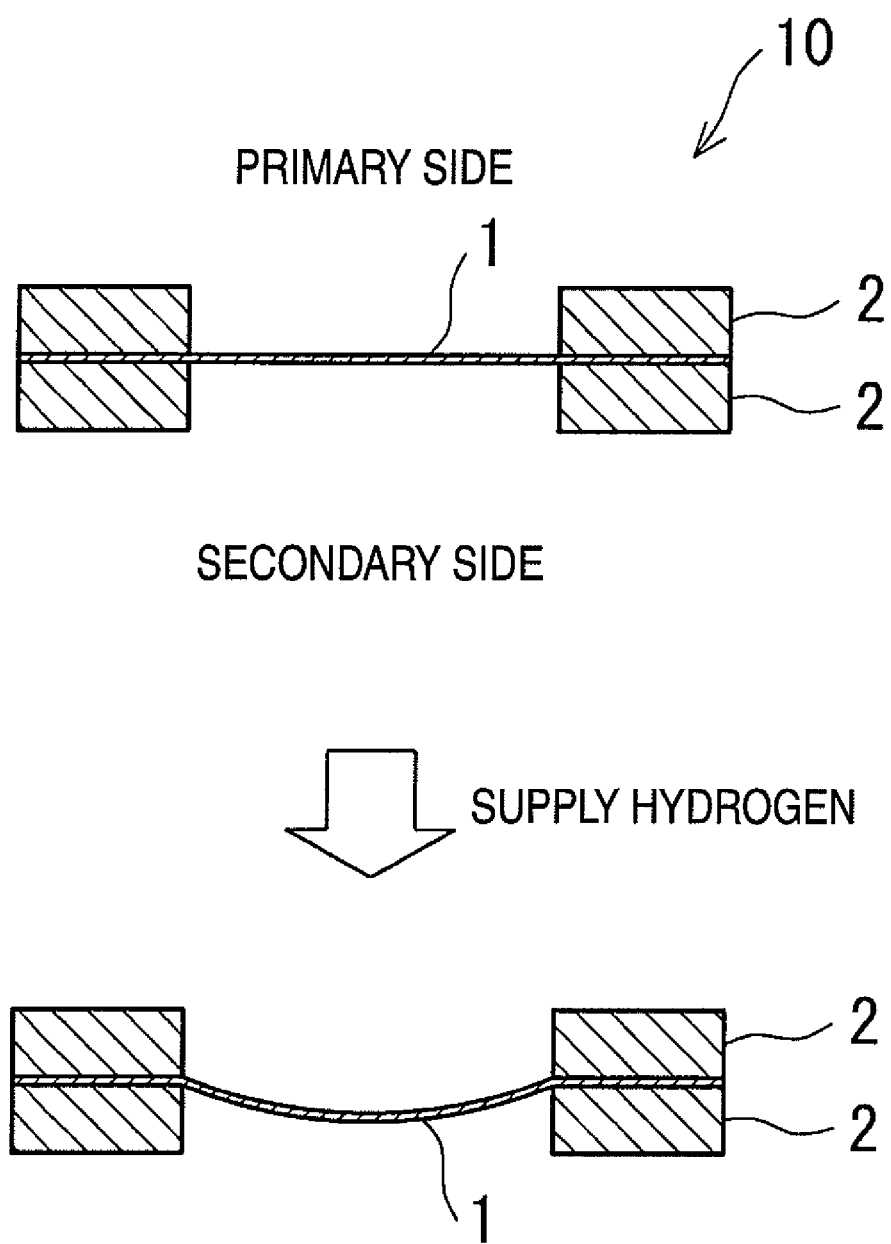

CREASE

CRACK

FIG. 10
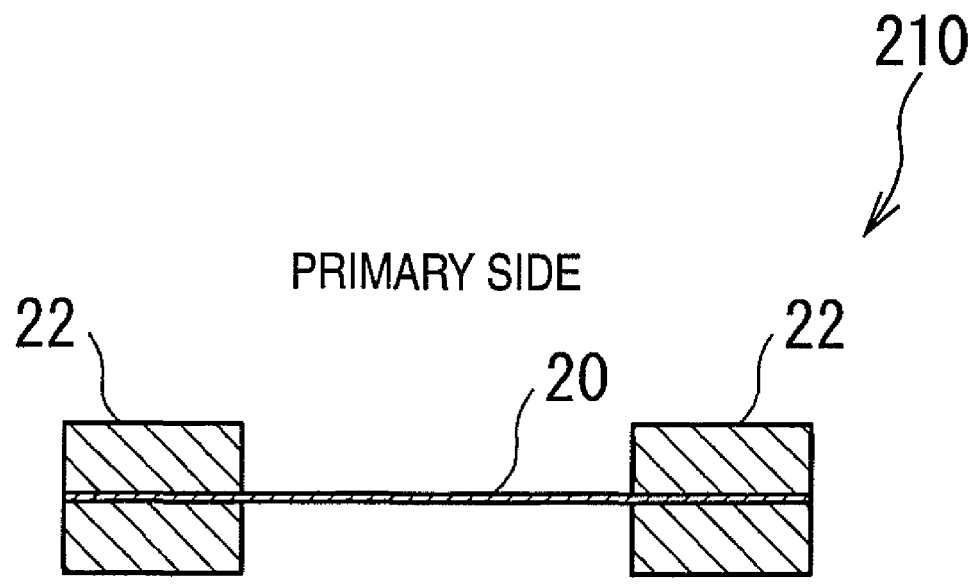
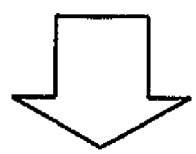
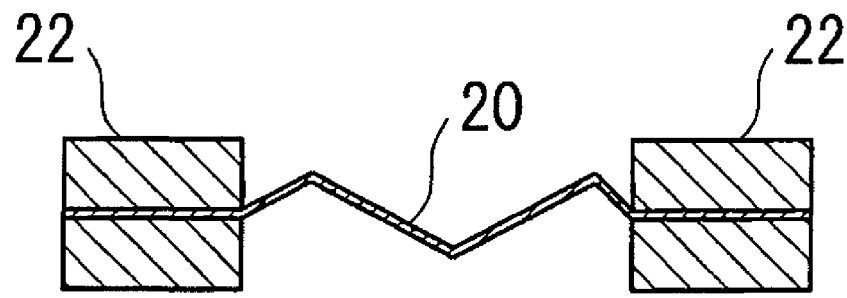

HYDROGEN PERMEABLE MODULE AND USAGE THEREOF

This application claims priority from Japanese Patent Application No. 2008-076119 filed on Mar. 24, 2008, the entire subject matter of which is incorporated herein by reference.

BACKGROUND OF THE INVENTION

1. Field of the Invention

The invention relates to a hydrogen permeable module to be used for separation and purification of hydrogen and a usage thereof.

2. Description of the Related Art

High purity hydrogen is used for productions of semiconductors, optical fibers, chemicals, and the like, and a use amount thereof is being increased year by year. Hydrogen has recently attracted attention as a fuel for a fuel cell, and it is considered that a large amount of hydrogen of high purity will be required when the fuel cell is actually used in future. Therefore, there is a demand for development of a method capable of producing high purity hydrogen in a large amount at a low cost.

A membrane separation method using a metal membrane receives attention as one of hydrogen purification methods. This method is theoretically capable of obtaining hydrogen having a purity of 100%, and an alloy that is based mainly on Pd has been put into practical use so far. However, from the view point of hydrogen producing at low cost, a hydrogen permeability of the current Pd-based alloy is insufficient, and there is an urgent need for development of a material for a hydrogen permeable membrane having a larger hydrogen permeability than the Pd-based alloy.

In a hydrogen permeable membrane, a hydrogen pressure of a primary side is kept higher than that of a secondary side, so that a gradient of a hydrogen concentration caused in a direction of a thickness of the membrane is used as a driving force for causing hydrogen to permeate from the primary side to the secondary side by diffusion. Examples of elements having high hydrogen permeability include Va group elements such as V, Nb, and Ta, but a hydrogen concentration at a temperature and a hydrogen pressure of which the hydrogen permeable module is actually used is remarkably high as compared to that of Pd. For example, when the hydrogen concentration per unit volume of Pd at a temperature of 500° C. and a hydrogen pressure of 100 kPa is 1, the hydrogen concentrations of V, Nb, and Ta are 9.3, 33.8, and 18.

When the hydrogen concentration is large, a volume is largely expanded along with hydrogen absorption, and a fragile intermetallic compound is generated in some cases, thereby easily causing a crack. Therefore, JP-B-4-74045 and JP-B-5-79367 disclose an alloy that is reduced in hydrogen concentration by adding Ni, Co, and Mo to V, for example. Also, a part of the inventors proposed a multi-phase alloy based on Nb in JP-A-2006-265638.

Meanwhile, it is necessary to keep a membrane thickness as small as possible since the hydrogen flux and the membrane thickness of a hydrogen permeable membrane are in inverse relationship. In order to prevent the membrane from being broken due to a pressure difference, it is necessary to provide a hydrogen permeable module with a support for ensuring a flow path of hydrogen permeated through to the secondary side and supporting the membrane. For example, JP-A-5-85702 discloses a production method for a hydrogen permeable membrane of forming a film of Pd or a Pd alloy on a porous support by plating or ion plating. Japanese Patent No. 3540495 discloses a hydrogen separation member wherein a hydrogen permeable membrane produced by a production method such as rolling is overlapped with a support ensuring a flow path for permeated hydrogen at a secondary side of the hydrogen permeable membrane, and a whole contact area between the membrane and the support is diffusion-bonded.

In addition to Japanese Patent No. 3540495, JP-A-5-85702 discloses a structure in which the Pd layer or the Pd alloy layer and the porous support are bonded, and the hydrogen permeable membrane is restricted at these parts by the support. In the hydrogen permeable alloys based on the Va group elements, the hydrogen concentration is reduced by alloying as described above, but the hydrogen concentration is still large as compared to that of Pd. For example, a hydrogen concentration of Pd at 300° C. and 100 kPa is H/M=0.02 (reference: New Version of Metal Hydride Alloy—Physical Properties and Applications by Agne Gijutsu Center), while the hydrogen concentration of the $V_{90}Mo_{10}$ alloy disclosed in JP-B-5-79367 is 0.3. In the Nb-based multi-phase alloy that the part of inventors has disclosed, a hydrogen concentration of $Nb_{52}Ti_{25}Co_{23}$ at the above-specified temperature and hydrogen pressure is 0.45, which largely exceeds the hydrogen concentration of Pd like the V alloy. As described above, the hydrogen permeable alloy based on the Va group elements exhibits the hydrogen concentration that is considerably larger than that of the Pd-based alloy and, therefore, has a large expansion amount involved with the hydrogen absorption. Since the support is produced by a material that does not absorb hydrogen, such as a ceramic and stainless steel, only the hydrogen permeable membrane is expanded, and the hydrogen permeable membrane is prevented from being freely deformed, thereby raising the risk of causing crack in the vicinity of the restricted part of the deformation in the case of a large expansion amount. Further, in JP-A-5-85702 and Japanese Patent No. 3540495, since a part of the hydrogen permeable part is bonded with the support, an actual hydrogen permeable area is reduced to reduce the hydrogen permeation amount in some cases as compared to the case where the support is not provided.

SUMMARY OF THE INVENTION

One object of the invention is to provide a hydrogen permeable module, in which a hydrogen permeable membrane can be freely deformed, in which the hydrogen permeable membrane can be prevented from being cracked, and which can ensure hydrogen permeation amount. Another object of the invention is to provide a hydrogen permeable module that can prevent generation of crease by causing a whole permeable part of the hydrogen permeable membrane to expand from a primary side to a secondary side that is lower in pressure than the primary side.

According to a first aspect of the invention, there is provided a hydrogen permeable module comprising: a hydrogen permeable membrane that permeates hydrogen, an outer peripheral part of the hydrogen permeable membrane being restricted, an inside of the outer peripheral part of the hydrogen permeable membrane being not restricted, wherein the hydrogen permeable module permeates the hydrogen by constantly keeping a pressure of a primary side to a pressure that is equal to or more than a pressure of a secondary side, and wherein the inside of the outer peripheral part of the hydrogen permeable membrane is not restricted so as to be capable of expanding to the secondary side.

According to a second aspect of the invention, the hydrogen permeable module further comprising: a support, which has a support surface, and which is provided at the secondary side, wherein the support surface follows a shape of the hydrogen permeable membrane expanded to the secondary side by virtue of hydrogen absorption.

According to a third aspect of the invention, in the hydrogen permeable module, wherein the support further comprises a plurality of hydrogen permeable pores.

According to a fourth aspect of the invention, the hydrogen permeable module further comprises: two module frames that sandwich the hydrogen permeable membrane so as to restrict the outer peripheral part of the hydrogen permeable membrane According to a fifth aspect of the invention, there is provided a usage of the hydrogen permeable module according to the first aspect, comprising: starting supply of a gas containing hydrogen to the hydrogen permeable module in a state where a pressure of the primary side of the hydrogen permeable membrane is equal to or more than that of the secondary side; and expanding the hydrogen permeable membrane to the secondary side along with the hydrogen absorption by maintaining a state where the pressure of the primary side is constantly higher than that of the secondary side after the start of gas supply.

According to a sixth aspect of the invention, there is provided a method of permeating hydrogen by using the hydrogen permeable module according to the first aspect, the method comprising: starting supply of a gas containing hydrogen to the hydrogen permeable module in a state where a pressure of the primary side of the hydrogen permeable membrane is equal to or more than that of the secondary side; and expanding the hydrogen permeable membrane to the secondary side along with the hydrogen absorption by maintaining a state where the pressure of the primary side is constantly higher than that of the secondary side after the start of gas supply According to the aspects of the invention, since only the outer peripheral part of the hydrogen permeable membrane is restricted, and since the part inside of the outer peripheral part is not restricted and is capable of expanding to the secondary side, it is possible to suppress generation of crease that can be a starting point of crack by: keeping the pressure of the primary side higher than that of the secondary side after starting to supply the gas containing hydrogen to the hydrogen permeable module; and allowing a volumetric expansion of the membrane along with hydrogen absorption only to the secondary side by loading a force for pressing the hydrogen permeable membrane on the secondary side by the pressure difference. Incidentally, after the start of gas supply, there is provided a period in which the pressure of the primary side is higher than that of the secondary side. In other words, there is no case where a state in which the primary side pressure and the secondary side pressure are equal to each other continues throughout a period from the start of the gas supply to the hydrogen permeable module under an atmosphere without hydrogen to an arrival at a steady state of the pressures at the respective sides of the hydrogen permeable membrane.

Further, in the case where the force loaded on the hydrogen permeable membrane by the pressure difference largely exceeds a force required for causing the expansion of the hydrogen permeable membrane during the hydrogen absorption to be expansion to the secondary side under the environments such as where the hydrogen permeable module is used in a hydrogen purification, when the support having a support surface following a shape of the hydrogen permeable membrane expanded to the secondary side due to hydrogen absorption is disposed at the secondary side, the hydrogen permeable membrane is expanded to the secondary side without generation of crease and brought into a state where a load due to the pressure difference between both sides of the membrane is not applied, thereby exhibiting good crack resistance. Furthermore, as compared to a structure of bonding with the support at a hydrogen permeable part, effects of increasing a substantial hydrogen permeable area and increasing a hydrogen flux are achieved.

BRIEF DESCRIPTION OF THE DRAWINGS

FIGS. 1A and 1B are diagrams showing a hydrogen permeable module according to Embodiment 1 of the invention, in which FIG. 1A shows a cross-sectional view of the hydrogen permeable module and FIG. 1B shows a schematic view of the hydrogen permeable module;

FIG. 2 is a diagram showing behavior of a hydrogen permeable membrane in the hydrogen permeable module;

FIGS. 3A to 3C are diagrams showing a hydrogen permeable module according to Embodiment 2 of the invention, in which FIG. 3A shows a cross-sectional view of the hydrogen permeable module, FIG. 3B shows a schematic view of the hydrogen permeable module and FIG. 3C shows a state in which a hydrogen permeable membrane is expanded and supported by a support surface of a support of the hydrogen permeable module in FIG. 3A;

FIG. 10 is a diagram showing a behavior of a hydrogen permeable membrane in a hydrogen permeable module according to another reference example.

DETAILED DESCRIPTION OF THE PREFERRED EMBODIMENTS

Reference Example

Figure 9:
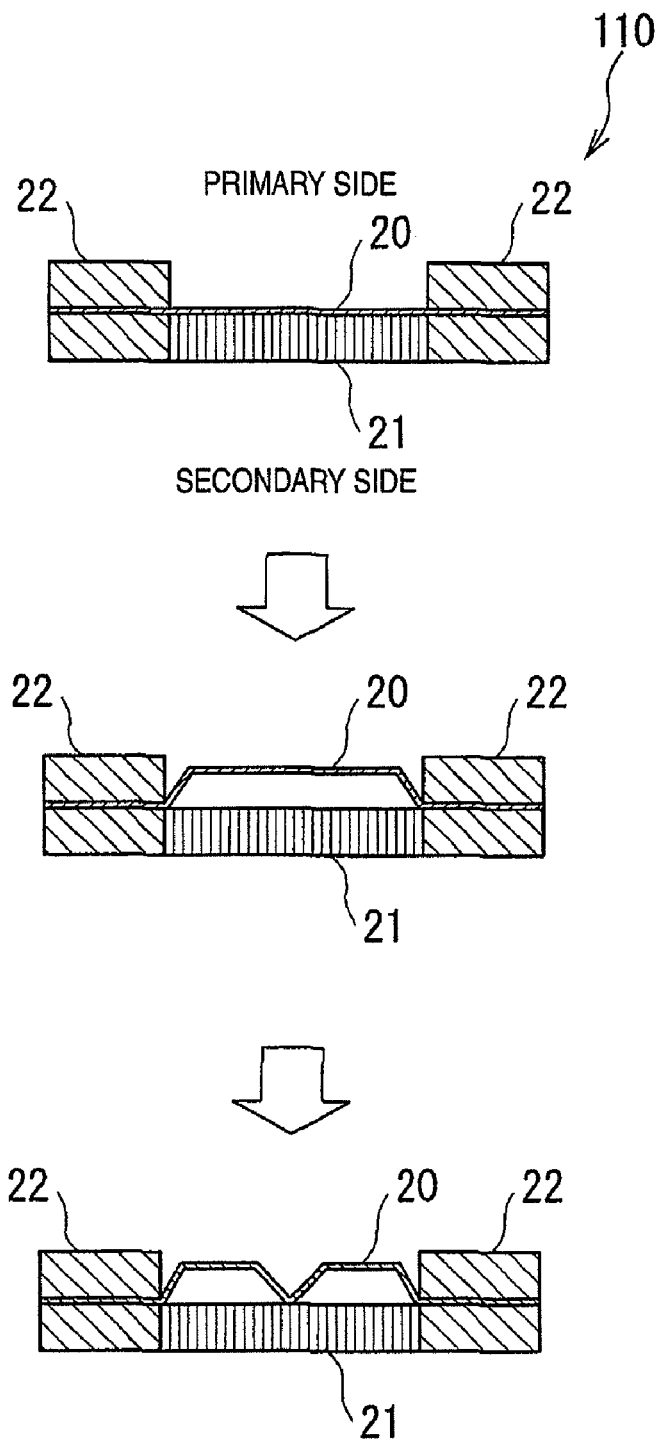
FIG. 9 is a diagram showing a behavior of a hydrogen permeable membrane in a hydrogen permeable module according to one reference example.

FIG. 9 shows one reference example of a hydrogen permeable module. As shown in FIG. 9, a hydrogen permeable module 110 according to the one reference example includes a hydrogen permeable membrane 20 and a support 21 that is overlapped with each other so that only a peripheral part is bonded with a module frame 22 or the like. The hydrogen permeable membrane 20 is expanded only to a primary side since the hydrogen permeable membrane is prevented from expanding to a secondary side as being blocked by the support 21 when expanding along with hydrogen absorption. However, since a pressure of the primary side is higher than that of the secondary side, the expansion to the primary side may be crushed by the pressure difference to cause a crease that is the cause of a crack.

FIG. 10 shows another reference example of a hydrogen permeable module. As shown in FIG. 10, a hydrogen permeable module 210 according to the another reference example includes a hydrogen permeable membrane 20 that is allowed to expand to the secondary side without being blocked by a support, and a module frame 22 that bonds a peripheral part of the hydrogen permeable module 210. The hydrogen permeable membrane 20 is capable of expanding to both of the primary side and the secondary side. However, when pressure increase is performed in such a manner that pressures at the both sides of the hydrogen permeable membrane are identical to each other, expansions to the primary side and the secondary side may be caused at random, and the expansions may be combined to cause a crease that can be a starting point of crack.

Thus, the invention is made to prevent generation of crease by causing a whole permeable part of the hydrogen permeable membrane to expand from a primary side to a secondary side that is lower in pressure than the primary side.

Embodiments of the invention will now be described with reference to the drawings.

Embodiment 1

As a hydrogen permeable membrane, those having a hydrogen absorption and permeation property may be used, and a material for the hydrogen permeable membrane is not particularly limited. For example, an alloy based on the Va group may be used, and, in view of the fact that a substantial hydrogen permeable area is increased as compared to the conventional structure of bonding with a support at a hydrogen permeable part, a Pd alloy that does not have satisfactory hydrogen flux may be used.

Figure 1A:
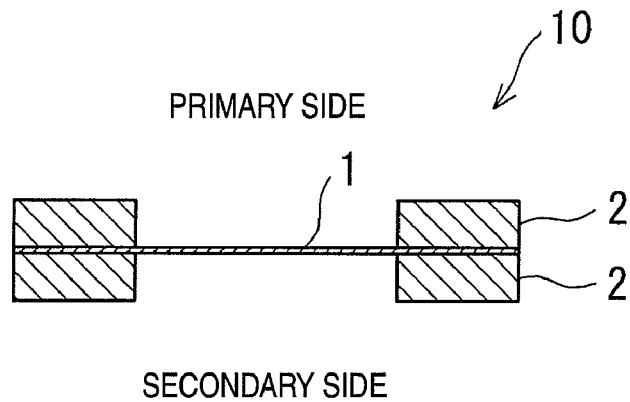
Figure 1B:
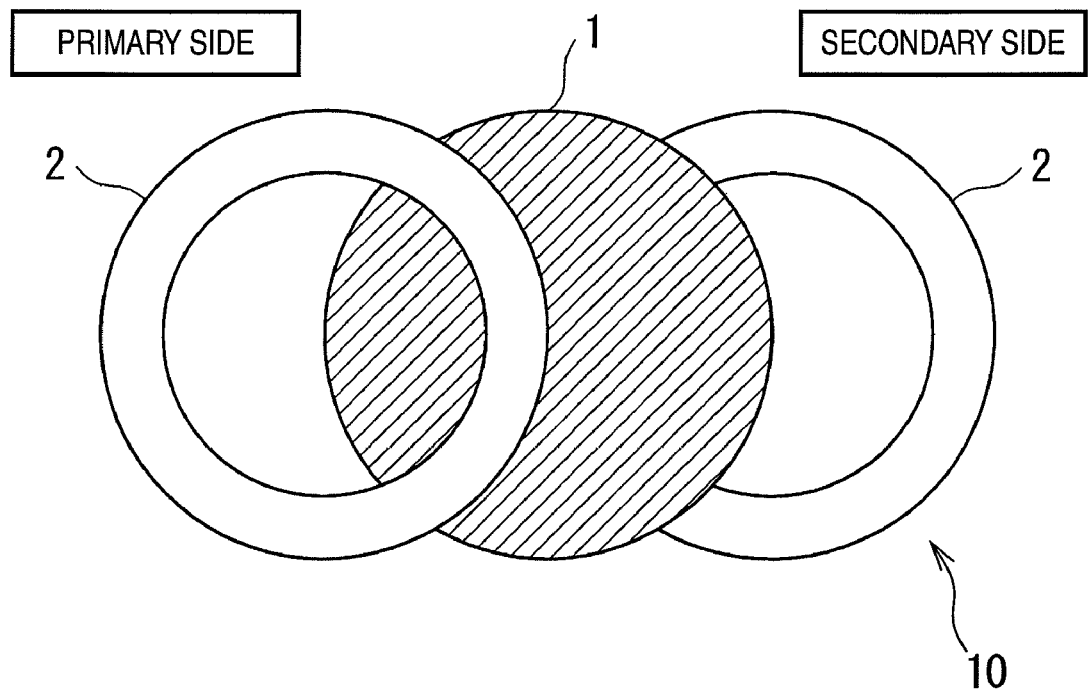

The hydrogen permeable membrane 1 is formed to have an appropriate membrane thickness in view of hydrogen permeability, membrane strength, and the like, but a membrane thickness in the invention is not limited, and steps of a production are not particularly limited. Only an outer peripheral part of the hydrogen permeable membrane 1 is restricted, and a part inside of the outer peripheral part is not restricted. The restriction at the outer peripheral part may be performed by an appropriate method and using an appropriate fixing member and the like. In Embodiment 1, module frames 2 are disposed in such a manner as to sandwich the hydrogen permeable membrane 1 from a primary side and a secondary side to be restricted together with the hydrogen permeable membrane 1, thereby obtaining a hydrogen permeable module 10 (see, for example, FIGS. 1A and 1B). As a result, the hydrogen permeable membrane 1 inside the module frames 2 is capable of expanding to the primary side or the secondary side. Incidentally, in the Embodiment 1, the module frame 2 has a ring-like shape. However, a shape of the module frame 2 is not limited thereto. For example, the module frame 2 may have a rectangular shape or a square shape.

Hereinafter, a usage of the hydrogen permeable module 10 will be described.

In advance of hydrogen supply, an atmosphere of the hydrogen permeable membrane 1 is maintained to a vacuum state using an evacuation pump or to an inert gas atmosphere of nitrogen, argon, or the like. Subsequently, a gas containing hydrogen is supplied from the primary side, and a pressure of the primary side is maintained to be constantly higher than that of the secondary side to which hydrogen is permeated.

In the hydrogen permeable membrane 1, hydrogen supplied from the primary side is absorbed, and the hydrogen diffuses and permeates to the secondary side. In this case, the hydrogen permeable membrane 1 is expanded along with the hydrogen absorption, but, since the pressure of the primary side is so set as not to be lower than that of the secondary side, volumetric expansion caused by the hydrogen absorption becomes expansion to the secondary side, thereby preventing generation of crease and generation of crack in the hydrogen permeable membrane 1. The pressure adjustment for the primary side and the secondary side may be performed in such a manner that the pressure of the primary side is adjusted to a predetermined value based on previously obtained information in order to keep the pressure of the primary side to be higher than that of the secondary side or in such a manner that the gas supply to the primary side is adjusted based on detection results of the pressure of the primary side and the pressure of the secondary side.

Embodiment 2

A force to be loaded on the hydrogen permeable membrane 1 by the pressure difference may be of the size that enables the expansion of the hydrogen permeable membrane 1 to the secondary side corresponding to the expansion by the hydrogen absorption in order to prevent generation of crease on the hydrogen permeable membrane 1. However, it is considered that, under the environment such as where the hydrogen permeable module is used for hydrogen purification, the former (i.e., the force to be loaded on the hydrogen permeable membrane 1 by the pressure difference) will largely exceed the latter (i.e., the size that enables the expansion of the hydrogen permeable membrane 1 to the secondary side).

Figure 3A:
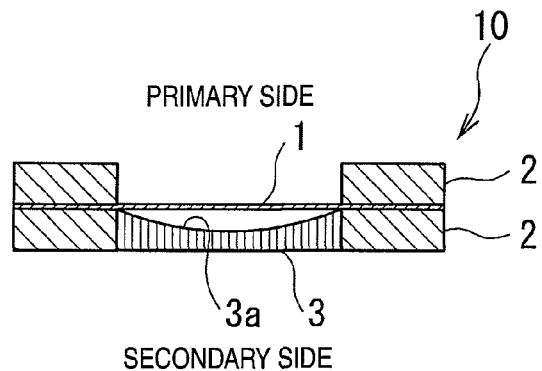
Figure 3B:
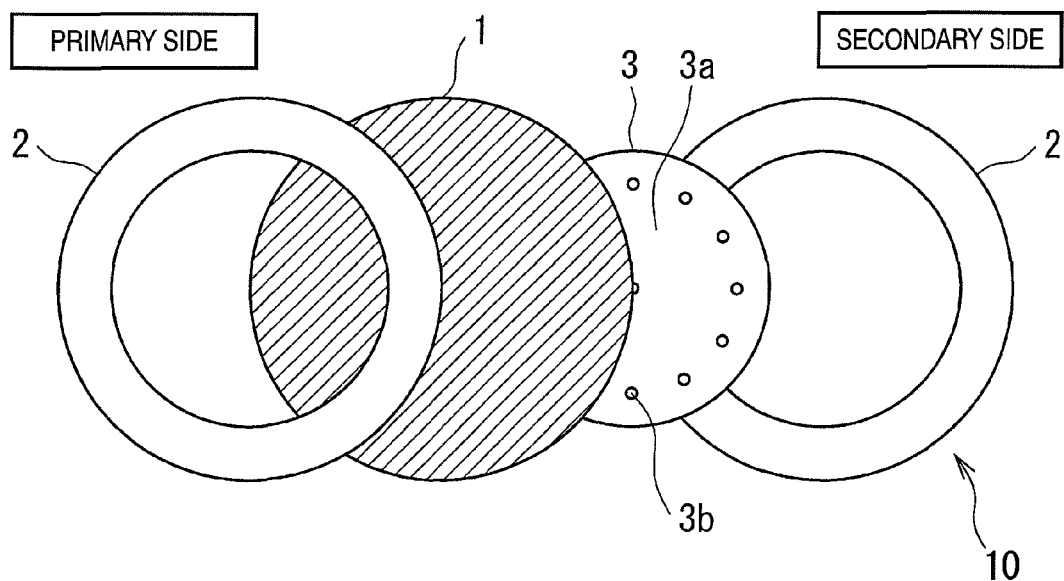
Figure 3C:
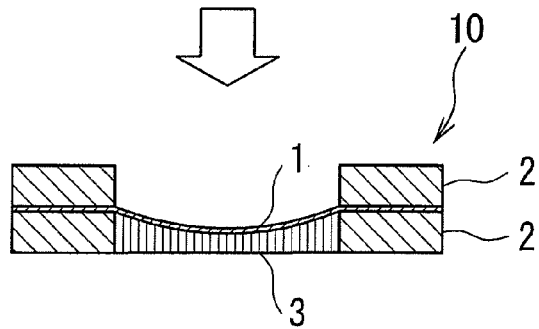
Figure 4:
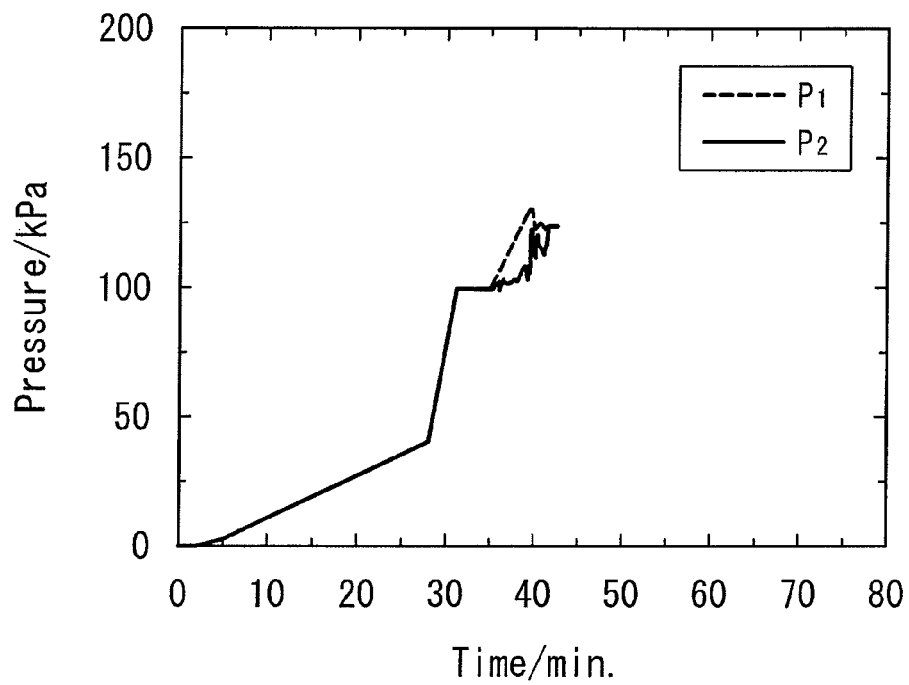
FIG. 4 is a diagram showing temporal changes in pressures at a primary side and a secondary side in Example.

In the case where the force of pressing the hydrogen permeable membrane to the secondary side is too large, the hydrogen permeable module 10 according to Embodiment 2 of the invention can be used. As shown in FIG. 3, the hydrogen permeable module 10 according to Embodiment 2 includes a support 3 having a support surface 3a that supports the hydrogen permeable membrane 1 along the shape formed due to the expansion of the hydrogen permeable membrane 1 by the hydrogen absorption. The hydrogen permeable membrane 1 is restricted by way of the fixation with the module frames 2 at the outer peripheral part of the support 3 as in the Embodiment 1, but a partial shape of the support 3 may function as the module frames. The support 3 includes a plurality of hydrogen permeable pores 3b serving as flow paths through which hydrogen is permeated, so that hydrogen permeation is allowed when the hydrogen permeable membrane 1 is expanded and supported by the support surface 3a of the support 3.

According to Embodiment 2, the hydrogen permeable membrane 1 expands to the secondary side without generation of crease and is free from the load otherwise caused by the pressure difference of the both sides of the hydrogen permeable membrane 1, thereby exhibiting good crack resistance.

Example

Hereinafter, Example of the invention will be described.

An alloy having a composition of $Nb_{52}Ti_{25}Co_{23}$ was prepared by an argon arc melting method, and a plate having a thickness of 1 mm was cut out from the alloy. A foil having a thickness of 25 μm was prepared from the plate by performing cold rolling and annealing for several times, and mechanical polishing of both surfaces of the foil was performed so as to eliminate oxide layers formed on the surfaces. A circular shape having a diameter of about 35 mm was cut out from the foil, and a film of 150 nm of Pd was formed on the surfaces by sputtering for oxidation prevention to obtain a hydrogen permeable membrane.

The hydrogen permeable membrane was fixed to a cylindrical chamber made from a stainless steel via a gasket corresponding to the module frames or the support of the foregoing embodiment, and heating to 400° C. was performed in a state where the inside of the chamber was evacuated to the order of $10^{-3}$ Pa. At 400° C., hydrogen was supplied to the chamber until 200 kPa, and a state of deformation of the hydrogen permeable membrane caused by hydrogen absorption was observed in situ by using a CCD camera through a window provided on the chamber.

Test conditions and temporal changes of pressures (primary side: $P_1$, secondary side: $P_2$) are shown in FIG. 4 to FIG. 7, and results of the observation from the primary side of the hydrogen permeable membrane during pressure increase are shown in FIGS. 8A to 8D. In each test, the gasket corresponding to the module frames that enables the hydrogen permeable part of the hydrogen permeable membrane to freely deform as described in the foregoing embodiment is provided at the primary side of the hydrogen permeable membrane.

The gasket corresponding to the module frames that does not restrict the hydrogen permeable part of the hydrogen permeable membrane was used for the primary side and the secondary side in Inventive Example and Comparative Example 3, and a circular gasket that prevents expansion to the secondary side was used for the secondary side in Comparative Examples 1 and 2. The circular gasket had a structure wherein several pores serving as flow paths for permeated hydrogen are provide.

Figure 6:
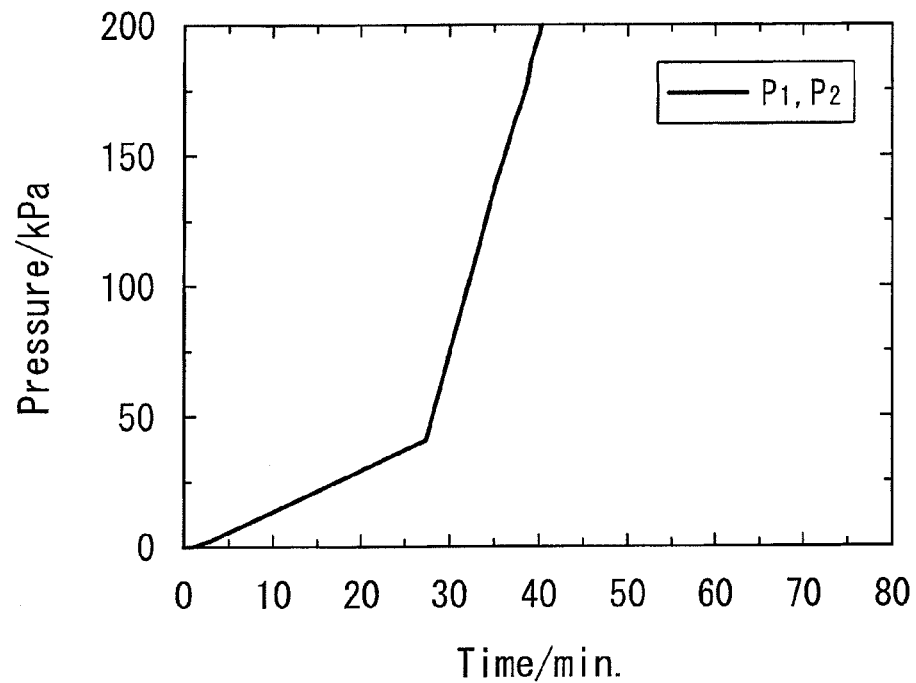
FIG. 6 is a diagram showing temporal changes in pressures at the primary side and the secondary side in Example.
Figure 8A:
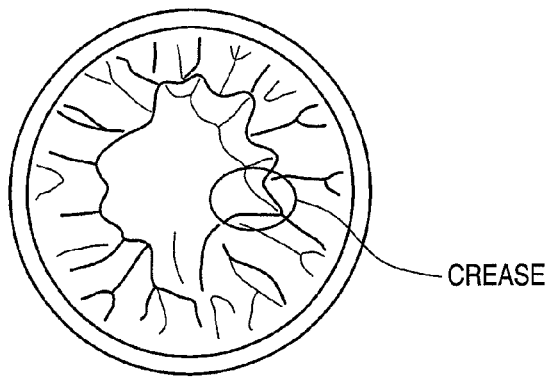
FIGS. 8A to 8D are diagrams showing a behavior of a hydrogen permeable membrane in Example.
Figure 8B:
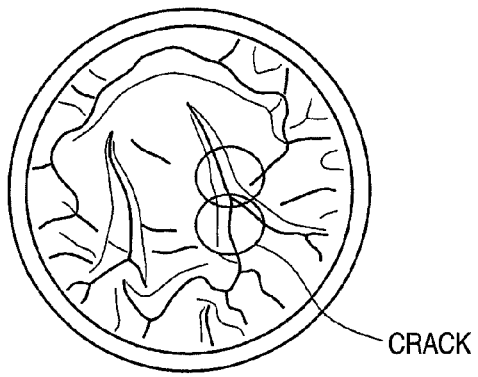
Figure 8C:
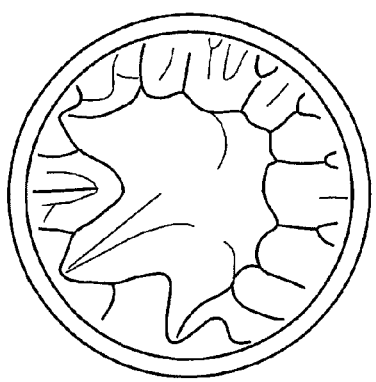

In Comparative Example 3, the gasket allowing the hydrogen permeable part to freely deform was provided at the secondary side in the same manner as in the primary side. The pressure was increased in a state where the primary side pressure and the secondary side pressure were maintained to an identical value up to 200 kPa from the start of the pressure increase as shown in FIG. 6, and a large crease was generated at the hydrogen permeable part as shown in FIG. 8C. Though leak check was not performed on the hydrogen permeable membrane, it is expected that a crack would have easily been caused along the large crease.

Figure 7:
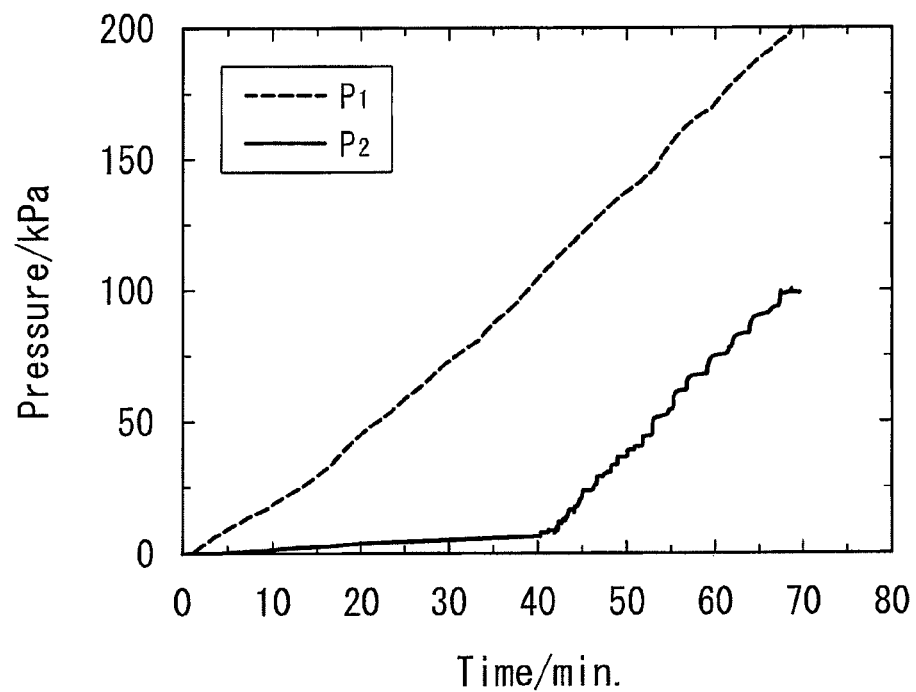
FIG. 7 is a diagram showing temporal changes in pressures at the primary side and the secondary side in Example.
Figure 8D:
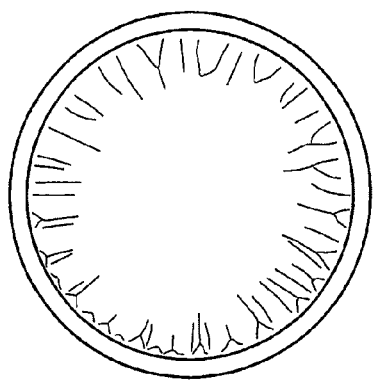

In Inventive Example, the gasket same as that of the primary side of the hydrogen permeable membrane was provided on the secondary side in the same manner as in Comparative Example 3. Hydrogen was supplied only to the primary side in order to load a pressure difference to the hydrogen permeable membrane immediately after the start of pressure increase in the same manner as in Comparative Example 2, and, after the primary side pressure exceeded 100 kPa, as shown in FIG. 7, the pressure was increased until the primary side pressure reached to 200 kPa with the pressure difference between the primary side and the secondary side being maintained to 100 kPa. As shown in FIG. 8D, the

TABLE 1

| | Test Temperature | Permeable Membrane Ambient Pressure before Hydrogen Supply | Type of Gasket at Secondary Side | Pressure Adjustment Method during Pressure Increase |
|---|---|---|---|---|
| Comparative Example 1 | 400° C. | Order of $10^{-3}$ Pa | Conventional Support-Simulated Type | Up to 100 kPa: $P_1 = P_2$ Over 100 kPa: $P_1 > P_2$ |
| Comparative Example 2 | | | Conventional Support-Simulated Type | $P_1 > P_2$ |
| Comparative Example 3 | | | Same as Primary Side (Permeable Part is Capable of Free Modification) | $P_1 = P_2$ |
| Inventive Example | | | Same as Primary Side (Permeable Part is Capable of Free Modification) | $P_1 > P_2$ |

$P_1$: primary side pressure; $P_2$: secondary side pressure

In Comparative Example 1, the pressure was increased in the state where the pressures at the primary side and the secondary side were maintained to the identical value up to 100 kPa after the start of pressure increase, and a pressure difference was loaded by supplying hydrogen only to the primary side after reaching to 100 kPa. The hydrogen permeable part was entirely expanded to the primary side to be in the form of a dome in a state where the pressure difference was not loaded at 100 kPa, but a central part of the hydrogen permeable part was depressed to the secondary side to generate a crease when the primary side pressure was increased to be higher than the secondary side pressure. When the primary side pressure reached to 130 kPa, the crease which is shown in a circle in FIG. 8A generated to cause a crack.

Figure 5:
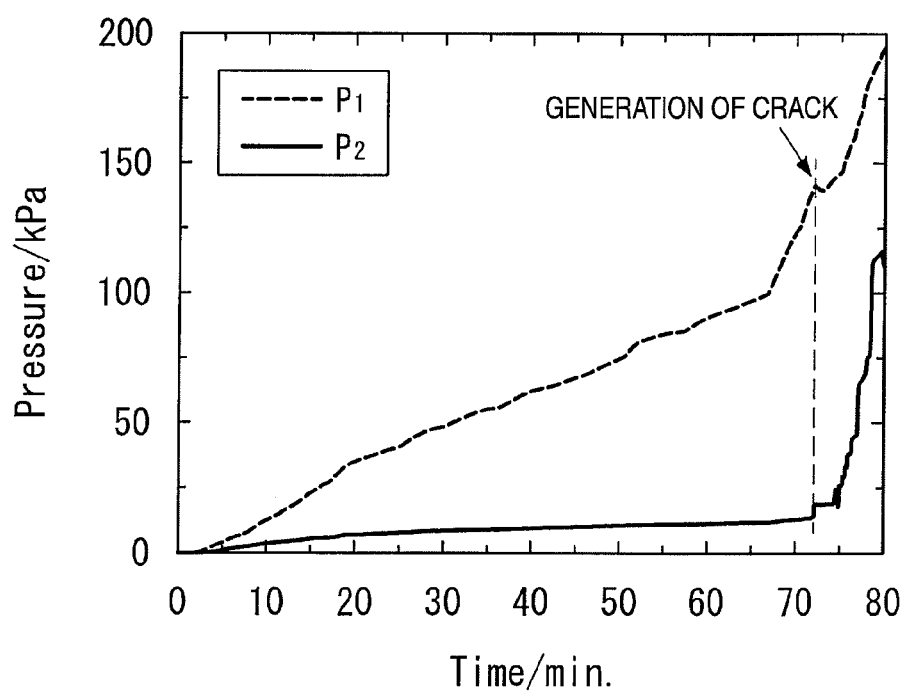
FIG. 5 is a diagram showing temporal changes in pressures at the primary side and the secondary side in Example.

In Comparative Example 2, the gasket having the shape of preventing the expansion of the hydrogen permeable membrane to the secondary side was provided in the same manner as in Comparative Example 1. In Comparative Example 2, since hydrogen was supplied only to the primary side in order to load a pressure difference to the hydrogen permeable membrane immediately after the start of pressure increase as shown in FIG. 5, the hydrogen permeable membrane was expanded as being pressed to the gasket at the secondary side to generate a crease at a central part of the sample, thereby causing a crack at the position indicated by the circle in FIG. 8B at the time point when the primary side pressure reached to 140 kPa.

hydrogen permeable part was entirely expanded to the secondary side to be in the form of a dome, and generation of crease was suppressed. No crack was confirmed in the hydrogen permeable membrane.

What is claimed is:

1. A hydrogen permeable module comprising:
   a hydrogen permeable membrane that permeates hydrogen, an outer peripheral part of the hydrogen permeable membrane being restricted, an inside of the outer peripheral part of the hydrogen permeable membrane being not restricted,
   wherein the hydrogen permeable module permeates the hydrogen in a state where a pressure of a primary side is more than a pressure of a secondary side,
   wherein the inside of the outer peripheral part of the hydrogen permeable membrane is not restricted so as to be capable of expanding to the secondary side,
   wherein the hydrogen permeable module further comprises a stationary support, which has a support surface, and which is provided at the secondary side, and
   wherein the support surface corresponds to a shape of the hydrogen permeable membrane expanded to the secondary side by virtue of a pressure difference between the primary side and the secondary side in the state where the pressure of the primary side is more than the pressure of the secondary side.

2. The hydrogen permeable module according to claim 1, wherein the stationary support further comprises a plurality of hydrogen permeable pores.

3. The hydrogen permeable module according to claim 1, further comprising:
two module frames that sandwich the hydrogen permeable membrane so as to restrict the outer peripheral part of the hydrogen permeable membrane.

4. A method of permeating hydrogen by using the hydrogen permeable module according to claim 1, the method comprising:
starting supply of a gas containing hydrogen to the hydrogen permeable module in a state where a pressure of the primary side of the hydrogen permeable membrane is equal to or more than that of the secondary side so as to expand the hydrogen permeable membrane by virtue of hydrogen absorption; and
expanding the hydrogen permeable membrane to the secondary side along with the hydrogen absorption by maintaining a state where the pressure of the primary side is constantly higher than that of the secondary side after the start of gas supply.

5. The hydrogen permeable module according to claim 1, wherein the support is configured to accommodate a space between the membrane and the stationary support.

6. The hydrogen permeable module according to claim 5, wherein the support is configured to accommodate the space between the membrane and the stationary support when the membrane is not expanded to the secondary side by virtue of the pressure difference between the primary side and the secondary side and the membrane contacts the stationary support when the membrane is expanded to the secondary side by virtue of the pressure difference between the primary side and the secondary side.

7. The hydrogen permeable module according to claim 1, wherein the stationary support is made of a material such as a ceramic and stainless steel and only the hydrogen permeable membrane is expanded.

8. The hydrogen permeable module according to claim 1, wherein the stationary support is made of a stainless steel.

* * * * *